United States Patent [19]

Mucciarone

[11] Patent Number: 5,708,990
[45] Date of Patent: Jan. 20, 1998

[54] COMMODE FLUSH ACCESSORY

[76] Inventor: Domenick Mucciarone, 3645 Boca Ciega Dr., Naples, Fla. 33962

[21] Appl. No.: 705,593

[22] Filed: Aug. 29, 1996

[51] Int. Cl.⁶ .............................. E03D 1/14; E03D 5/092
[52] U.S. Cl. .............................. 4/324; 4/405; 4/249
[58] Field of Search .............................. 4/324, 325, 405, 4/415, 249, 250

[56] References Cited

U.S. PATENT DOCUMENTS

| | | | |
|---|---|---|---|
| 1,595,741 | 8/1926 | Sweeney | 4/250 |
| 3,095,577 | 7/1963 | Clark | 4/325 X |
| 3,719,957 | 3/1973 | Riedel | 4/415 X |
| 3,745,591 | 7/1973 | Girten | 4/415 X |
| 3,883,904 | 5/1975 | Wittman | 4/249 |
| 4,356,576 | 11/1982 | Gala | 4/324 X |
| 4,412,362 | 11/1983 | Nylund | 4/415 X |
| 4,847,924 | 7/1989 | Samaniego | 4/249 |
| 4,916,761 | 4/1990 | Pavlik | 4/324 |
| 5,232,011 | 8/1993 | Royalty | 4/324 X |
| 5,289,594 | 3/1994 | Wiewiorowski | 4/415 |

FOREIGN PATENT DOCUMENTS

| | | | |
|---|---|---|---|
| 716236 | 8/1965 | Canada | 4/324 |

*Primary Examiner*—Robert M. Fetsuga
*Attorney, Agent, or Firm*—Oldham & Oldham Co., L.P.A.

[57] ABSTRACT

Water-saving device for flush toilet. A water-saving device as shown and described herein comprises a frame which can be mounted on the exterior of a conventional toilet water tank, a vertical shaft which is integrally formed on the frame for receiving a reciprocable lever mechanism, and a flush lever mechanism which comprises a vertical member which reciprocate vertically in the shaft and a horizontal extension which extends from the vertical member to the outside end of a conventional toilet tank flush handle. As installed, the outside end of this extension is positioned just above the outer end of the flush handle. When the toilet is not in use, the outer end of the extension will be positioned just above the flush handle. To use the device, a user presses the flush lever mechanism downwardly until it is stopped by a gap adjustment screw against the bias of a compression spring, so that the extension engages the flush handle, actuating the toilet tank flush valve to a partially open position. When the user releases the flush lever mechanism, the flush lever mechanism will return to its normal upward position, allowing the flush handle to return to its normal position so that the toilet tank flush valve closes. A full flush can be obtained when desired either using the water-saving device herein (and holding it down long enough to obtain a full flush) or by actuating the flush handle in the usual manner without using the water-saving device. This invention provides a simple, reliable, easy-to-install, and easy-to-use device which permits appreciable water savings.

15 Claims, 3 Drawing Sheets

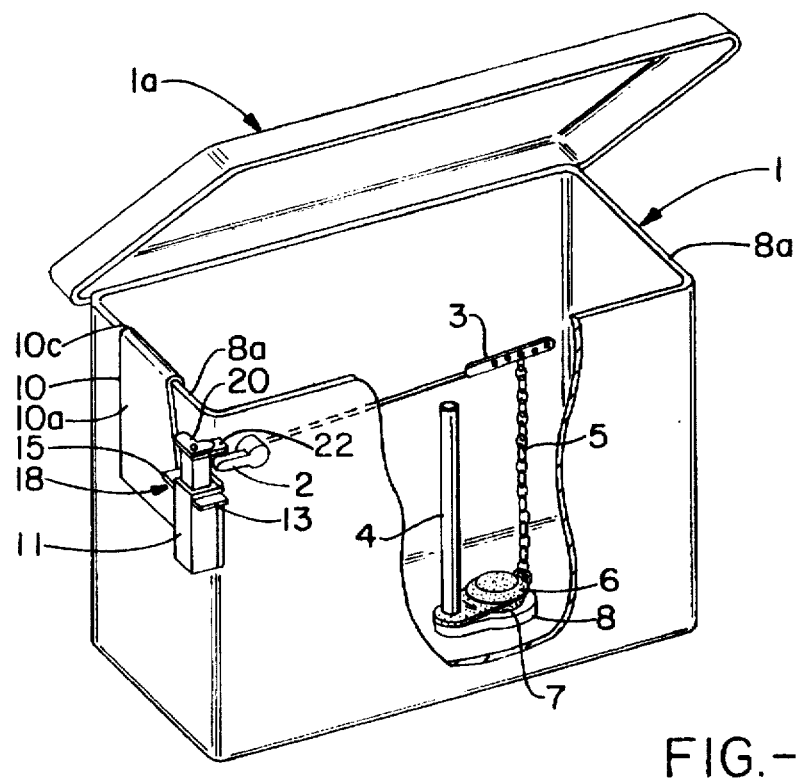
FIG.-1
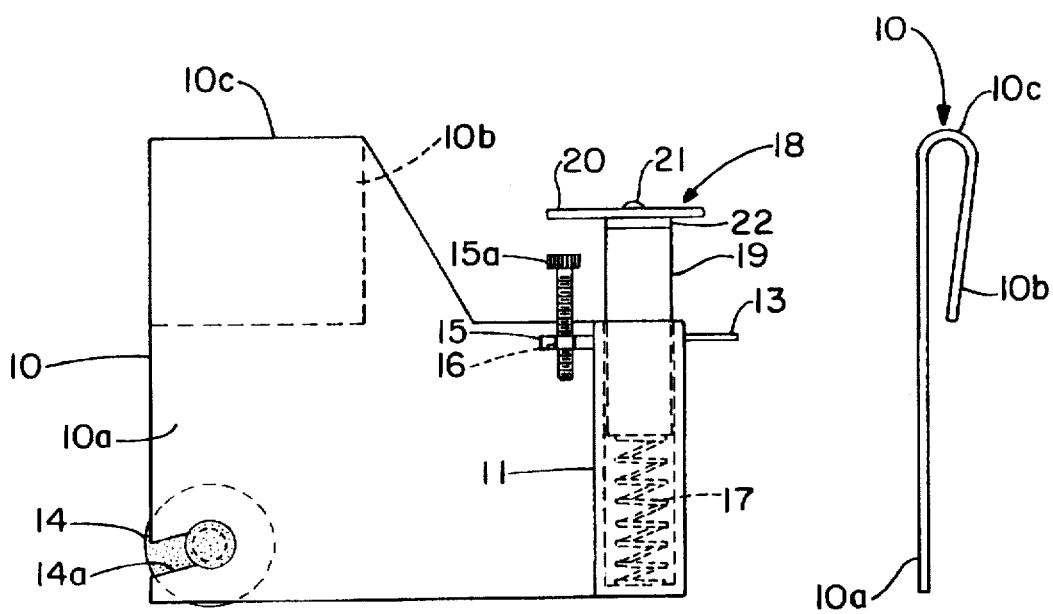
FIG.-2
FIG.-4

COMMODE FLUSH ACCESSORY

TECHNICAL FIELD

This invention relates to a water-saving device or accessory for a flush toilet.

BACKGROUND

Various devices for limiting the quantity of water used by a flush toilet and thereby conserving water are known. Some of these devices are complicated; others require an additional manual presetting of the device for selecting a setting prior to flushing; still others do not adapt to different lengths of a conventional flush handle. In short, while various devices are known, none has the simplicity and ease of use which would be desirable in such a device.

SUMMARY OF THE INVENTION

This invention provides a water-saving device for a flush toilet and, in particular, for a flush toilet which employs a conventional rectangular water tank having a flush handle mounted on the exterior, a drain at the bottom of the tank for water, and a valve which is controlled by the flush handle and which, in turn, controls the drain opening.

The device of the present invention is mounted on an exterior side wall of a toilet tank adjacent to the flush handle so that the device may engage the flush handle. The device of this invention comprises a frame, a mounting structure for mounting the frame on a side of a toilet tank so that at least a major portion of the frame is on the outside of the toilet tank, and means forming a vertical shaft for a flush lever member. The device of this invention further includes a vertically reciprocable lever mechanism for engaging and actuating the flush handle to accomplish a partial flush. This lever mechanism comprises a vertical member which reciprocates in the vertical shaft, and a horizontal extension (or lever arm) which engages the flush handle. The lever mechanism also includes a top. A gap adjustment screw makes contact with the bottom of the lever mechanism top for limiting downward movement of said lever mechanism. This horizontal extension (or lever arm) and the vertical member are vertically reciprocable between a first position in which the outer portion of the lever arm overlies an outer portion of the flush handle, and a second position in which the lever arm engages the flush handle and rotates it until stopped by the gap adjustment screw. When the lever arm and vertical member are in the second position, the flush valve is partially unseated from the valve seat, but will immediately close if the flush handle is released, assisted by a return spring which is biased to move the vertical member and the lever arm affixed thereto upwardly so as to permit the flush handle to return to a position in which the flush valve is closed.

BRIEF DESCRIPTION OF THE DRAWINGS

This invention will be particularly described with reference to the preferred embodiment thereof in which:

FIG. 1 is a perspective view of a standard toilet tank, showing sufficient structure of the toilet tank for explanation of the present invention, with a water-saving device according to the present invention attached.

FIG. 2 is a side elevational view of a water-saving device of this invention.

FIG. 4 is a side elevational view of a loop hanger for a water-saving device of this invention.

DESCRIPTION OF THE PREFERRED EMBODIMENTS

This invention will now be described in detail with reference to the best mode and preferred embodiment thereof, as illustrated in the accompanying drawings.

Referring now to FIGS. 1, 5, 6 and 7, a conventional flush toilet includes a water tank 1 and a tank lid 1a. The water tank 1 is typically rectangular in shape, comprising a bottom and four vertical side walls extending upwardly therefrom. The vertical side walls terminate in a water tank rim 8a which extends around a perimeter of the water tank. The water tank is open at the top and is covered by tank lid 1a. A body of water 1b substantially fills the water tank 1; the water level is typically just a short distance below the top rim 8a.

Figure 5:
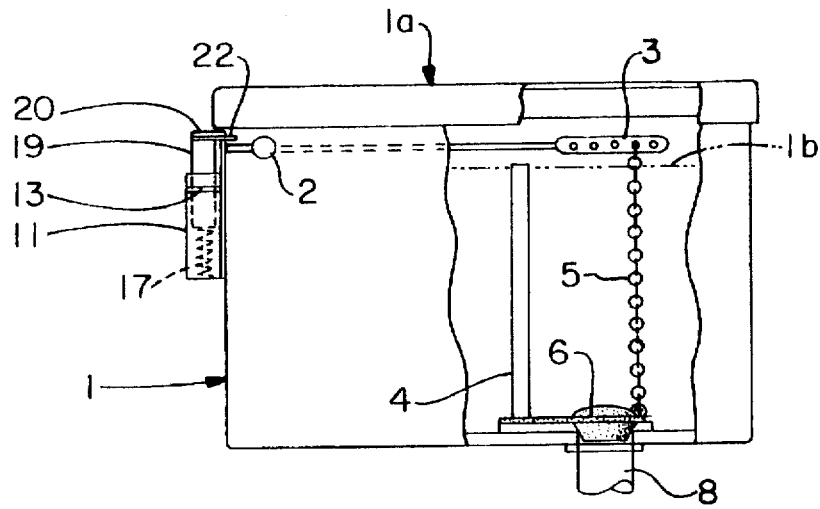
FIGS. 5, 6 and 7 are front views of the conventional toilet tank shown in FIG. 1 with a portion cut away and with the water-saving device of this invention attached, showing the toilet tank flush valve in a closed, an open and a partially open position, respectively.
Figure 6:
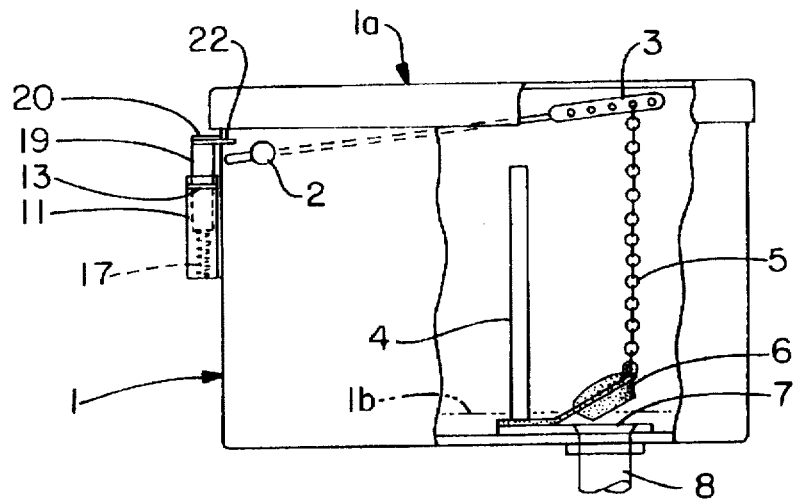
Figure 7:
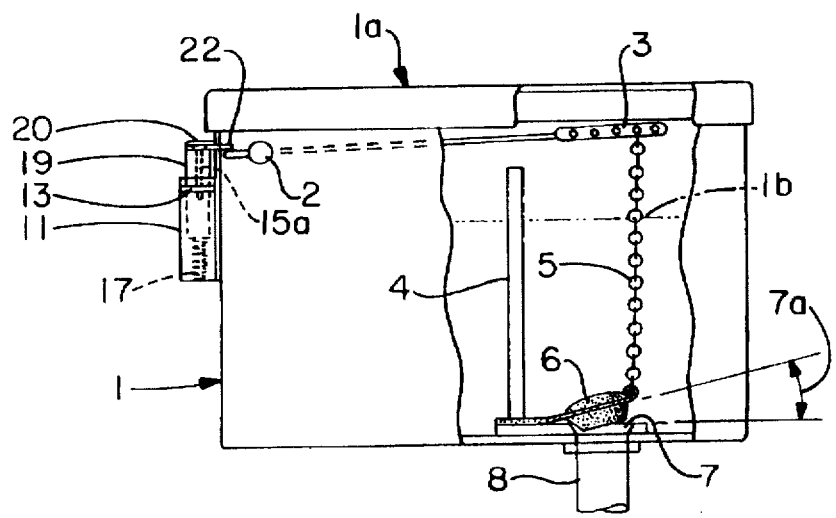

A pivotally mounted and horizontally extending flush handle 2 is pivotally mounted at one end on the exterior of the front wall of water tank 1. As shown in FIG. 5, the flush handle 2 extends horizontally when flush mechanism is "at rest" i.e., between flushes. In FIG. 6, the flush handle 2 is tilted full downward for a full flush. In FIG. 7, the flush handle 2 is tilted slightly for a partial flush. An outer end of the flush handle 2 (at the end opposite of the pivotally mounted end) is in proximity with an edge and a side wall (typically a left side wall) of the toilet tank 1.

Inside the tank 1 are a water inlet valve assembly (not shown) and a vertical overflow tube 4. The tank is refilled after a flush by water supplied through the water inlet valve assembly.

A flush mechanism inside the water tank 1 includes a generally horizontal flush lever arm 3, a lift chain 5 which extends vertically downwardly from one end of the horizontal lever arm 3, and a pivotally mounted flush valve 6 which is attached to the lower end of chain 5. At the bottom of tank 1 is an outlet or tank drain 8, through which water empties when the toilet is flushed. The upper end of drain 8 forms a valve seat 7.

The flush valve 6 seats on valve seat 7 between flushes. The flush handle 2 is in a horizontal position, as shown in FIG. 5, between flushes.

While flush toilet mechanisms currently in use vary, the foregoing description and the illustration in FIGS. 1, 5, 6 and 7 are representative of conventional flush toilet mechanism now in use.

When a conventional commode is flushed, the flush handle 2 is moved to a downward position, as shown in FIG. 6, lifting flush valve 6 from valve seat 7. The arc path of flush valve 6 is uninterrupted, and reaches and remains in an upright position, as shown in FIG. 6, causing a full flush emptying tank 1, FIG. 6 completely of water (with only a small volume just above the bottom of the tank 1 and below the valve seat 7), draining the tank water.

A water-saving device according to the best mode and preferred embodiment thereof will now be described with reference to the drawing.

Referring now especially to FIGS. 1, 2, and 4, a water-saving device, according to this invention, comprises a main frame 10 which, in turn, includes an outside frame member 10a in the form of a thin, flat plate having an outer surface and an inner surface, and an inside frame member 10b in the form of a downwardly extending clip. The outside frame member 10a and the inside frame member 10b are joined together along respective top edges by an essentially semicircular portion or hanger loop 10c, which overlies the top rim 8a of the tank 1 along the left side wall thereof when the device is installed. The outside portion 10a of frame 10 may be essentially L-shaped, as seen in FIG. 2, while the inside portion 10b may be rectangular, also as seen in FIG. 2.

FIG. 4 shows the frame 10 as seen on edge; it will be apparent from FIG. 4 that the vertical extent of the inside portion 10b is less than that of the outside portion 10a and that the inside portion 10b is, in effect, a hanger shaped so as to make it possible to attach the frame 10 onto the toilet tank upper rim 8a. The entire frame 10 (see FIG. 2) can be moved forward or backward along the top rim 8a of the left side wall of the tank 1 so that the needed operational position, clearances, and gaps may be obtained for the mechanism to perform as will be hereinafter described. After the frame 10 and the mechanism mounted thereon have been placed in the desired position, the looped hanger 10c may be secured by pushing it down. The shape of the hanger loop and the inward tilt of the inside portion 10b of the frame simultaneously apply inward spring-like pressure on the frame member 10a and 10b, forcing the respective frame members 10a and 10b closer to the respective outside and inside surfaces of the toilet water tank 1.

The frame 10 is positioned on a left side wall of toilet tank 1 so that the outside portion 10a of the frame overlies an outside surface of the left side wall of toilet tank 1, the inside frame member 10b overlies an inside surface of the left sidewall of toilet tank 1, and the loop hanger 10c overlies a portion of the top rim 8a of the left side wall of the toilet tank 1. The material forming frame 10 preferably has enough resilience so that the inside frame member 10b (or, at least a lower edge portion thereof) will grip the inside wall of the toilet tank and, thereby, hold the entire frame in place. As installed, the outside portion 10a of frame 10 has a portion which extends forwardly of the front wall of the toilet tank 1, and the shaft 11 is formed on this extension portion.

A device of this invention is preferably made of a durable plastic material. This plastic material is preferably essentially rigid; yet, because of the thinness of frame 10, the inside frame member 10b will have enough resilience to grip the inside wall of the toilet tank 1, as described above. Alternatively, the device may be made of a thin gauge metallic material (e.g., of sheet metal thickness).

A hollow vertical shaft 11 is integrally formed on outside frame member 10a adjacent to a right-hand edge thereof. This shaft 11 is formed on an exterior surface of the outside frame member 10a, i.e., on the surface which is away from the side wall of toilet tank 1 when the device of this invention is in operative position. Vertical shaft 11 is formed by a hollow shaft housing, which may be of square cross-sectional shape, comprising a bottom wall and four upstanding vertical side walls. The shaft housing is open at the top.

A horizontal finger grip 13 and a horizontally extending flush lever shaft shelf 15 are formed on opposite side walls of shaft 11 near the upper end thereof.

The water-saving device of this invention further includes an adjustable limit stop, preferably a gap adjustment screw 15a, which is received in screw hole 16 on shelf 15. The gap adjustment screw 15a permits a user to adjust the extent of the vertical travel of a lever mechanism 18 (to be described in detail below), and thereby fix the gap 7a, between the flush valve 6, and the valve seat 7. The gap adjustment screw 15a may be located elsewhere, e.g., on finger grip B (which is also a horizontal shelf), as long as it will be struck by lever mechanism 18 as it travels downwardly, thereby limiting the extent of travel.

A compression spring 17 is provided inside shaft 11 at the bottom thereof to assist in returning the lever mechanism 18 to a normal upward position.

The water-saving device of this invention further comprises a vertically reciprocable flush lever assembly or mechanism 18 (see especially FIG. 3), which, in turn, comprises a vertical rod-like lever member 19 which is vertically reciprocable in shaft 11, a thin flat horizontal lever top 20 which is removably secured to the vertical lever member 19, and a generally rectangular horizontal extension or lever arm 22 which is also removably secured to the vertical lever member 19.

Figure 3:
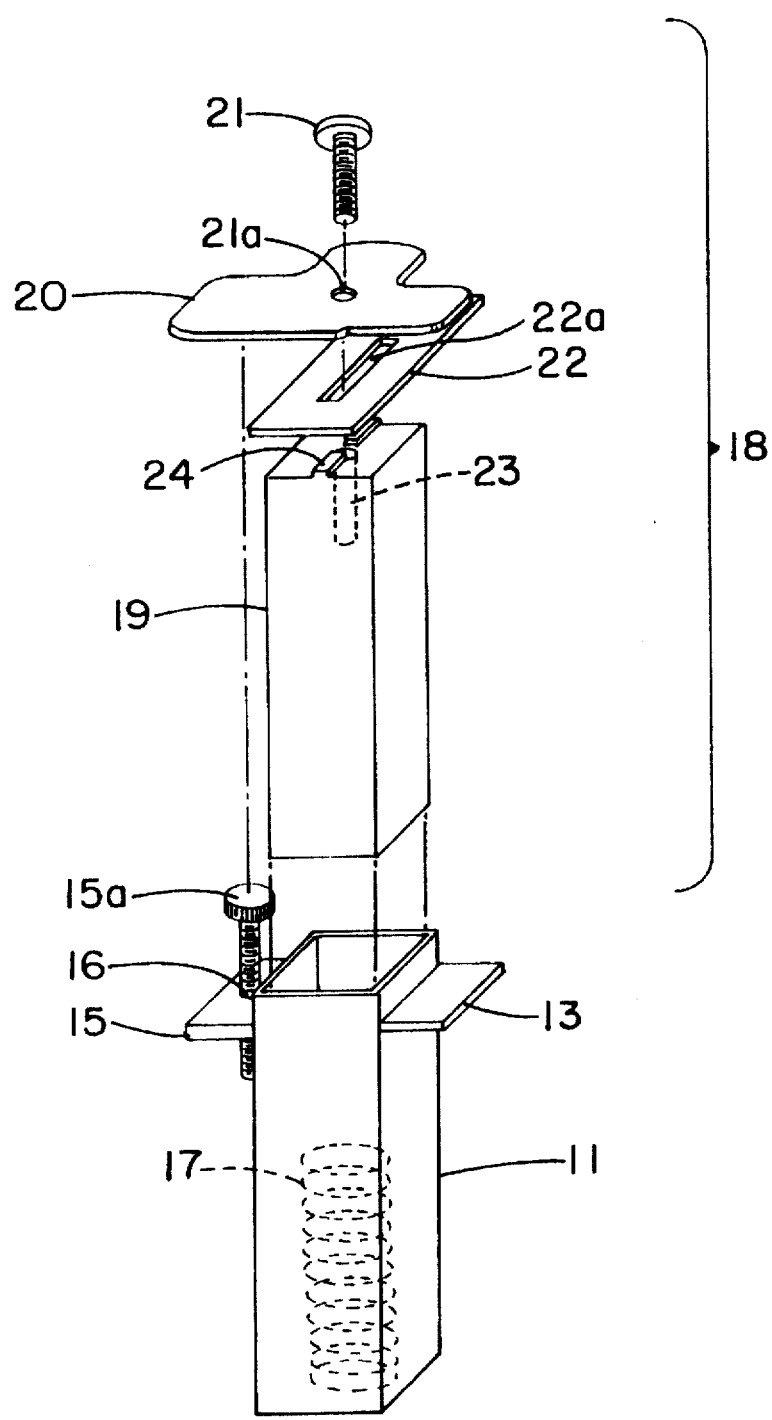
FIG. 3 is an exploded view of a water-saving device of the present invention.

The ends of the horizontal extension 22 may be rounded, as shown in FIG. 3, if desired. Extension 22 has a longitudinal axis which is disposed at right angles to the plane of the exterior portion 10a of the main frame 10 in a fully assembled device. Slot 22a is disposed along this longitudinal axis. In this way, the extension 22 extends along the outside of a front wall of toilet tank 1 from the vertical member 19 to just above the outside end of flush handle 2.

The vertical member 19 is of the same cross-sectional shape as the housing forming shaft 11 and is slightly smaller in size so that there is a small clearance between the exterior surfaces of the vertical member 19 and the corresponding inside surfaces of the shaft 11. A square shape is generally preferred for the shaft housing 11 and the vertical member 19; however, other cross-sectional shapes may be used if desired. A circular cross-sectional shape will ordinarily not be used since relative rotation between the flush lever assembly 18 and the shaft 11 is to be avoided, and a circular shape would permit such relative rotation unless a spline is used. One end of horizontal extension 22 fixedly engages a vertical member 19; the other end (an outer end) of horizontal extension 22 engages and actuates the flush handle 2. The horizontal extension 22 has a longitudinally extending slot 22a, which is received in a flush lever track 24 formed on top of the vertical member 19. This provides for adjustable positioning of the horizontal extension so that one end (the end remote from vertical member 19) will be positioned just above the outside end of the flush handle 2. A vertical flush lever top screw 21, which is received in a screw hole 23 which extends downwardly from the top of the vertical member 19, is provided for securing the horizontal extension 22 to the vertical member 19.

Flush lever top 20 has a screw hole 21 a extending therethrough, as may be seen in FIG. 3. The flush lever top 20 overlies the extension 22 when the entire device is assembled. A screw hole 21a in the flush lever top 20 receives screw 21, which secures the flush lever top 20, the horizontal lever arm or extension 22, and the vertical member 19 together so that the entire flush lever assembly 18 reciprocates vertically as a unit.

The water-saving device of this invention further includes a suction cup 14, which is affixed to the frame 10 as a support anchor. Suction cup 14 is received in a suction-cup slot and/or hole 14a formed in outside frame member 10a. Suction cup 14 is secured to left outside surface of tank 1. Suction cup 14 may be used to secure outside frame member 10a to a vertical surface of a support member (not shown and optional).

Flush lever top 20 extends beyond vertical lever member 19 in at least one horizontal direction and preferably (as shown) in all horizontal directions, so that the underside (or bottom) of lever top 20 will engage gap adjustment screw 15a as the lever mechanism 18 moves downwardly. Engagement of gap adjustment screw 15a by lever top 20 stops and limits downward movement of the lever mechanism 18 and thereby limits the movement of flush valve 6 to unseat from valve seat 7, as shown in FIG. 7, so that a partial flush is obtained.

The device herein illustrated shows one means of mounting on a toilet tank 1. Instead of an inside frame member and hanger loop, as illustrated, one may provide a frame having only an outside frame member such as 10a herein, which may be secured to a toilet tank 1 by various means, such as a spacer formed on an inside surface of the frame and having a double-sided adhesive thereon for attachment of the spacer to the outside of the toilet water tank 1.

The vertical flush lever mechanism 18 is preassembled as follows: vertical flush lever top leaf extension 22 is placed on top of vertical member 19 so that slot 22a of extension 22 is received in the flush lever track 24 on the vertical member 19. The flush lever top 20 is then placed over the flush lever top leaf extension 22. Flush lever top screw 21 is screwed into the flush lever top screw hole 21a and into screw hole 23 in the body of vertical member 19. The extension 22 is positioned so that its outside end will engage the flush handle 2 when the water-saving device is fully assembled. Screw 21 is screwed downward, securing flush lever top 20 and top leaf extension 22 onto the vertical member 24.

The vertical member 19 of the vertical flush lever mechanism is placed in shaft 11.

Operation of the water-saving device of this invention will now be described.

When the toilet is not in use, i.e., between flushes, the flush lever mechanism 18 is in an upward position, as shown in FIGS. 1 and 5, so that the extension 22 is just above a top surface of an outer portion of the flush handle 2 and thus does not actuate the flush handle 2. A lower end of vertical flush lever member 19 rests lightly on top of compression spring 17, maintaining the lever assembly 18 in this position.

To operate the device of this invention, a user places a finger under the finger grip 13 and grasps an upper surface of the flush lever top 20 with a thumb, then user presses down on the flush lever top 20. This causes the flush lever mechanism 18 to reciprocate downwardly, stopped by gap adjustment screw 15a, against the bias of spring 17, to a downward position in which lever mechanism 18 actuates flush handle 2. As the flush lever mechanism 18 lever descends, the extension 22 engages a top surface of flush handle 2, partially opening flush valve 6, as seen in FIG. 7. This creates a gap 7a, between the flush valve 6 and the valve seat 7, which is of the dimension as shown in FIG. 7. The gap 7a thus achieved is a partial opening of the flush valve 6. The gap 7a will remain consistently open as long as the user presses down on flush lever top 20.

While the valve seat 7 is open, water 1b will drain from tank 1 FIG. 7. The amount of water 1b emptied out of the tank 1, FIG. 7, depends upon how long the flush lever top 20 is held down. It is possible to empty as little as a quart of water. In this manner, one can control the amount of water 1b used in a flush. One can hold down the top 20 long enough to empty the tank completely; however, more typically, one will hold down the top 20 for a briefer duration so that tank FIG. 7 is only partially emptied of water 1b. (This is a partial flush.) When the user releases top 20, the flush lever mechanism 18 is returned to its normal upward position at the urging of compression spring 17 and the water pressure on the surface of flush valve 6. The valve seat 7 is then closed, and the toilet tank 1 is refilled by water supplied through the water inlet valve assembly.

When a full flush is desired, one may either use the device of this invention by holding down the flush lever top 20 long enough to empty the tank 1 completely, or one may bypass the device of this invention and, instead, directly actuate the flush handle 2 by hand in a conventional manner. The device of this invention, when properly installed, overlies only a small portion of the flush handle 2 at the outside end thereof and, thus, does not interfere with normal operation of the flush handle 2.

The device of the present invention is suitable and adaptable for use on most conventional commodes 1 regardless of size, water capacity and water level that are controlled by an inlet water valve assembly and float mechanism, lever arm 3, lift chain 4, and flush valve 6.

The device of the present invention is simple in design, easy to install, inexpensive, easy to use, and child friendly. One can obtain a partial flush of any desired duration using the device of this invention, simply by holding down the vertical flush lever mechanism 18, long enough to achieve the desired degree of flush. One can achieve a full flush either using the device of this invention (and holding down the flush lever mechanism 18 long enough to obtain a full flush) or by actuating the conventional flush handle 2 directly. Either an adult or a child can use the device of the present invention and achieve the desired water savings. The simplicity of the present device permits a child to use it effectively, while various device in the prior art are designed for adult usage. Children are responsible for a goodly portion of the water 1b wasted in the flushing of toilets. The device of this invention is, and looks like, an accessory, is simple, and is very easy to operate, thus encouraging child-friendly use.

It will be apparent to those skilled in the art that modifications may be made without departing from the spirit of this invention. Therefore, it is not intended that the scope of this invention be limited to the specific embodiments illustrated and described. Rather, it is intended that the scope of this invention be measures by the appended claims and equivalents thereof.

What is claimed is:

1. A water-saving device for a flush toilet having a toilet water tank comprising a drain having a valve seat surrounding an upper end of said drain, a valve adapted to seat on said valve seat and movable between an open position, a partially opened position, and a closed position, and a flush handle mounted on the exterior of said tank wherein said water-saving device comprises:

(a) a frame adapted to be mounted on said tank so that at least a portion of the frame is on the exterior of said tank;

(b) a vertical shaft for a flush lever member;

(c) a flush lever mechanism comprising (1) a vertical flush lever member which is vertically reciprocable in said shaft and (2) a flush lever extension which extends generally horizontally from said flush lever member and is adapted to make contact with said flush handle; and (d) a spring; and (e) an adjustable limit stop;

wherein said flush lever mechanism between an upward position in which it does not actuate said flush handle, and a downward position in which said lever actuates said flush handle, causing said flush valve to partially open and to remain partially open as long as the lever is in said downward position;

wherein further said limit stop stops the downward movement of the flush lever mechanism; and wherein further said spring biases said flush lever mechanism upwardly, so that downward movement of said flush lever mechanism is against the bias of said spring and upward movement of said flush lever mechanism is at the urging of said spring.

2. A water-saving device according to claim 1 wherein said flush lever extension is adapted to contact a top surface of said flush handle.

3. A water-saving device according to claim 1 wherein said spring is a compression spring at a lower end of said shaft.

4. A water-saving device according to claim 1 wherein said frame comprises an outside portion and an inside portion, said outside portion being adapted to be disposed along an outside surface of said toilet water tank and said inside portion being adapted to be disposed along an inside surface of said toilet water tank.

5. A water-saving device according to claim 4 wherein said outside portion and said inside portion are integrally joined together along respective top edges by a hanger loop.

6. A water-saving device according to claim 1, said device being pre-assembled.

7. A water-saving device according to claim 1, said device being made of a plastic material.

8. A water-saving device according to claim 1, wherein said gap adjustment screw for limiting downward movement of said flush lever mechanism.

9. A water-saving device according to claim 1 wherein said vertical member has a top end and a track located on said top end, and said flush lever extension has a slot which receives said track.

10. A water-saving device according to claim 1, further including a removable flush lever top which is placed over said flush lever extension, and a flush lever top screw for securing said flush lever top, said flush lever extension, and said vertical member together.

11. A water-saving device according to claim 1, wherein said shaft is formed by a vertical housing having a closed bottom and an open top.

12. A water-saving device according to claim 11 further including a finger grip and a shelf attached to an upper portion of said housing on the exterior thereof.

13. A water-saving device according to claim 12, wherein said limit stop is a gap adjustment screw which is received in said shelf.

14. A water-saving device according to claim 1 further including a suction cup affixed to said frame.

15. A water-saving device according to claim 1, said device being adapted to being operatively attached to said toilet water tank so as not to interfere with normal operation of said flush handle.

* * * * *